(12) United States Patent
Budlong

(10) Patent No.: US 8,768,855 B2
(45) Date of Patent: Jul. 1, 2014

(54) METHODS FOR THE TRANSFORMATION OF REAL ESTATE DATA TO PRODUCE USABLE DATA

(76) Inventor: Leigh Budlong, Sedona, AZ (US)

( * ) Notice: Subject to any disclaimer, the term of this patent is extended or adjusted under 35 U.S.C. 154(b) by 695 days.

(21) Appl. No.: 12/873,267

(22) Filed: Aug. 31, 2010

(65) Prior Publication Data

US 2011/0055091 A1   Mar. 3, 2011

Related U.S. Application Data

(60) Provisional application No. 61/238,613, filed on Aug. 31, 2009.

(51) Int. Cl.
| | |
|---|---|
| *G06Q 30/06* | (2012.01) |
| *G06Q 30/02* | (2012.01) |
| *G06Q 50/16* | (2012.01) |
| *G06Q 10/10* | (2012.01) |
| *G06Q 40/02* | (2012.01) |
| *G06Q 10/00* | (2012.01) |

(52) U.S. Cl.
CPC .............. *G06Q 10/00* (2013.01); *G06Q 50/16* (2013.01)
USPC ............ 705/313; 705/1.1; 705/314; 705/315

(58) Field of Classification Search
USPC .......................................... 705/313, 1.1–912
See application file for complete search history.

(56) References Cited

U.S. PATENT DOCUMENTS

| | | | | |
|---|---|---|---|---|
| 4,507,088 | A  * | 3/1985 | Wilson | 434/112 |
| 2010/0287199 | A1 * | 11/2010 | Fuhry et al. | 707/770 |

* cited by examiner

*Primary Examiner* — Jonathan Ouellette
(74) *Attorney, Agent, or Firm* — Steven A. Nielsen; Allman & Nielsen, P.C.

(57) ABSTRACT

Real estate data and municipal codes and zoning rules are transformed and translated into useable data for non-land use experts. Rating systems for zoning desirability and zoning flexibility are presented with user driven weight and priority systems. Disperse data sets related to real estate are marshaled into a coherent database structure for efficient searching and organization.

10 Claims, 29 Drawing Sheets

Clarity to cross referenced parts of the existing zoning codes

17.24.070 Permitted facilities.

The following facilities, as described in the use classifications in Chapter 17.10, are permitted:
A. Residential Facilities:
One-Family Dwelling
One-Family Dwelling with Secondary Unit, subject to the provisions specified in Section 17.102.360
Two-Family Dwelling
B. Nonresidential Facilities:
Enclosed
Open
C. Signs:
Residential
Special
Development
Realty
Civic
D. Telecommunications Facilities:
Micro, except as provided in Chapter 17.128
Mini, except as provided in Chapter 17.128

Zoning codes are written based on the notion of "on an increase in intensity" so referencing other sections is the norm.

Zonability collects those data pieces cited in another section to make a user looking at this code see a "complete" list sometimes with a synopsis to standardized language.

FIG 1—Clarity to cross referenced parts of the existing zoning codes

17.24.070 Permitted facilities.

The following facilities, as described in the use classifications in Chapter 17.10, are permitted:
A. Residential Facilities
One-Family Dwelling
One-Family Dwelling with Secondary Unit, subject to the provisions specified in Section 17.102.360
Two-Family Dwelling
B. Nonresidential Facilities:
Enclosed
Open
C. Signs:
Residential
Special
Development
Realty
Civic
D. Telecommunications Facilities:
Micro, except as provided in Chapter 17.128
Mini, except as provided in Chapter 17.128

Zoning codes are written based on the notion of "on an increase in intensity" so referencing other sections is the norm.

Zonability collects those data pieces cited in another section to make a user looking at this code see a "complete" list sometimes with a synopsis to standardized language.

FIG 2a—Uses are broken down for individual look ups by a particular code or use and its approval rating by the code, i.e. by right, subject to special approval

| ZONING DISTRICT | OTHER PRINCIPAL USES (Permitted as of Right) (§§209–209.9) | OTHER CONDITIONAL USES (Subject to Commission Approval ) (§§209–209.9) |
|---|---|---|
| RH-1(D) House, One-Family (Detached Dwellings) (§206.1) | | |
| RH-1 House, One-Family (§206.1) | | Residential care facility for 6 or fewer; child care facility for 12 or fewer; open space for horticulture or passive recreation; public structure or use of non-industrial character; sale or lease of sign. |
| RH-1(S) House, One-Family with Minor Second Unit (§206.1) | | Residential care facility for 6 or fewer; child care facility for 12 or fewer; open space for horticulture or passive recreation; public structure or use of non-industrial character; sale or lease sign. |

FIG 2b—Shows the invention taking the zoning code "use" information and adding a category that people readily understand

Zoning Information

RH-2 is Residential Housing.

| What Is Allowed? | |
|---|---|
| Uses Per Zoning Examples/Details | |
| At Home | Duplexes · 2 residential units |
| | Residential care · 6 beds or fewer |
| | Child Care · 12 children or fewer |
| At Gov | Open Space · Parks, gardens |
| | Public Use · Non-commercial |

As shown with invention: uses are organized by category "at home", "at work", "at play", "at gov" and listed in a clear manner. Users can do data retrieval and ask for zoning allows for: "at home" uses or a specific use like "child care".

FIG 3—Shows invention's method of breakdown of data by zoning code and specified use.

| | A | B | L | M | N | O | P |
|---|---|---|---|---|---|---|---|
| | | Exception | RH1-(D) | RH-1 | RH-1 (S) | RH-2 | RH-3 |
| 1 | SEC. 209.1-209.9 RESIDENTIAL | | | | | | |
| 2 | Single family home | | P | P | P | P | P |
| 3 | Single family home with minor 2nd unit | | | | P | P | P |
| 4 | Duplex | | | | | | P |
| 5 | Triplex | | | | | | P |
| 6 | Apartment | | | | | | |
| 7 | Residential care - 6 bed or fewer | | P | P | P | P | P |
| 8 | Childcare -12 or fewer | | P | P | P | P | P |
| 9 | Residential care - 7+ beds | | C | C | C | C | C |
| 10 | Childcare -13+ children | | C | C | C | C | C |
| 11 | Group housing (boarding & religious) | | | | C | C | C |
| 12 | Hotel - 5 rooms | | | | | | |
| 13 | Childcare -13+ children (limited to ground floor) | | | | | | |
| 14 | Hotel - 5 rooms (limited to ground floor) | | | | | | |
| 15 | Hotel - 6 room (limited to ground floor) | | | | | | |
| 16 | Live/work-art | | | | | | |
| 17 | Auto parking | | | | | | |
| 18 | Elementary school | | C | C | C | C | C |
| 19 | Secondary school | | C | C | C | C | C |
| 20 | Greenhouse | | C | C | C | C | C |
| 21 | Plant nursery | | | | | | |
| 22 | Private recreation facility | | C | C | C | C | C |

P = Permitted Use   C= Conditional Use

FIG 4 Shows typical table format for "Size" information related to Zoning Ordinance rules

| ZONING DISTRICT | MINIMUM LOT SIZE (§121) | AREA RATIO (Other than Dwellings) (§124) | FRONT SET-BACK REQUIREMENTS (§132) | REAR YARD REQUIREMENTS (§134) |
|---|---|---|---|---|
| RH-1(D) House, One-Family (Detached Dwellings) (§206.1) | Width: 33 ft. Area: 4000 sq.ft. | 1.8 times lot area | Based upon average of adjacent buildings; up to 15 ft. or 15% of lot depth | 25% of lot depth, but no less than 15 feet |
| RH-1 House, One-Family (§206.1) | Width: 25 ft. Area: 2500 sq.ft. | 1.8 times lot area | Based upon average of adjacent buildings; up to 15 ft. or 15% of lot depth | 25% of lot depth, but no less than 15 feet |

NOTE: Existing data sources do not allow a user to look up a minimal lot size for a specific zoning code or to ask what zoning supports a specified "size" related issue, i.e. minimal lot size of 2,500.

| | A | B | C | D | E | F | G | H |
|---|---|---|---|---|---|---|---|---|
| 1 | Zoning | City | | Merged | | Min. Lot Size | Min. Lot Width | Max Height |
| 2 | RH1-(D) | San Francisco | One | RH1- | Resi | 4000 | 33 | 35 |
| 3 | RH-1 | San Francisco | One | RH-1 | Resi | 2500 | 25 | 35 |
| 4 | RH-1 (S) | San Francisco | One | RH-1 | Resi | 2500 | 25 | 35 |
| 5 | RH-2 | San Francisco | Two | RH-2 | Resi | 2500 | 25 | 40 |
| 6 | RH-3 | San Francisco | Three | RH-3 | Resi | 2500 | 25 | |
| 7 | RM-1 | San Francisco | | | Mixe | 2500 | 25 | |
| 8 | RM-2 | San Francisco | | | Mixe | 2500 | 25 | |
| 9 | RM-3 | San Francisco | | | Mixe | 2500 | 25 | |
| 10 | RM-4 | San Francisco | | | Mixe | 2500 | 25 | |
| 11 | RC-3 | San Francisco | | | Resi | 2500 | 25 | |
| 12 | RC-4 | San Francisco | | | Resi | 2500 | 25 | |
| 13 | RED | San Francisco | | | Resi | 2500 | 25 | |
| 14 | RTO | San Francisco | | | Resi | 2500 | 25 | r |
| 15 | C1 | San Francisco | | C1 | San Fra | 2500 | 25 | |
| 16 | C2 | San Francisco | | C2 | San Fra | 2500 | 25 | |
| 17 | C-3-O | San Francisco | | C-3-O | San | 2500 | 25 | |
| 18 | C-3-R | San Francisco | | C-3-R | Sa | 2500 | 25 | |
| 19 | C-3-G | San Francisco | | C-3-G | Sa | 2500 | 25 | |
| 20 | C-3-S | San Francisco | | C-3-S | Sa | 2500 | 25 | |
| 21 | C-M | San Francisco | | C-M | San | 2500 | 25 | |
| 22 | M-1 | San Francisco | | M-1 | San | 2500 | 25 | |
| 23 | M-2 | San Francisco | | M-2 | San | 2500 | 25 | |
| 24 | NC-1 | San Francisco | | NC-1 | San F | 2500 | 25 | varies |
| 25 | NC-2 | San Francisco | | NC-2 | San F | 2500 | 25 | 40 |
| 26 | NC-3 | San Francisco | | NC-3 | San F | 2500 | 25 | 40 |

FIG 5—Shows invention's method of breakdown of data by zoning code and size requirements FIG 6—Shows sample report with method to compare the zoning rules with a particular property to develop a hypothetical "what can be built" and what uses are "allowed"

RH-2 is Residential Housing.

| What Is Allowed? | What Is Allowed With Special Permission? |
|---|---|
| Uses Per Zoning Examples/Details | Uses Per Zoning Examples/Details |
| Duplexes · 2 residential units<br>Residential care · 6 beds or fewer<br>Child Care · 12 children or fewer<br>Open Space · Parks, gardens<br>Public Use · Non-commercial | Residential care · 7 beds or more<br>Child Care · 13 children or more<br>Schools/Education · Elementary, secondary or medical<br>Group Housing · Boarding houses, religious orders<br>Small Hotel · Up to 5 rooms |

What Size Building Can Be Built?

| Criteria | Requirements | Your Property |
|---|---|---|
| Minimum lot size in sf | 2,500 | |
| Minimum lot width in feet | 25 | |
| Front yard in feet | 15 | |
| Rear yard in feet | Calculated one of two ways: take 45% of the lot's depth or average the last 10 of the adjacent buildings. feet is limited to a 30 foot height. | |
| Maximum Number of Residential Units | 2 | |
| Floor Area Ratio – residential | Take lot area and divide by 1,500. | |
| Floor Area Ratio – for commercial | 1.8 | |
| Maximum Height | 40 feet (30 feet at front) | |

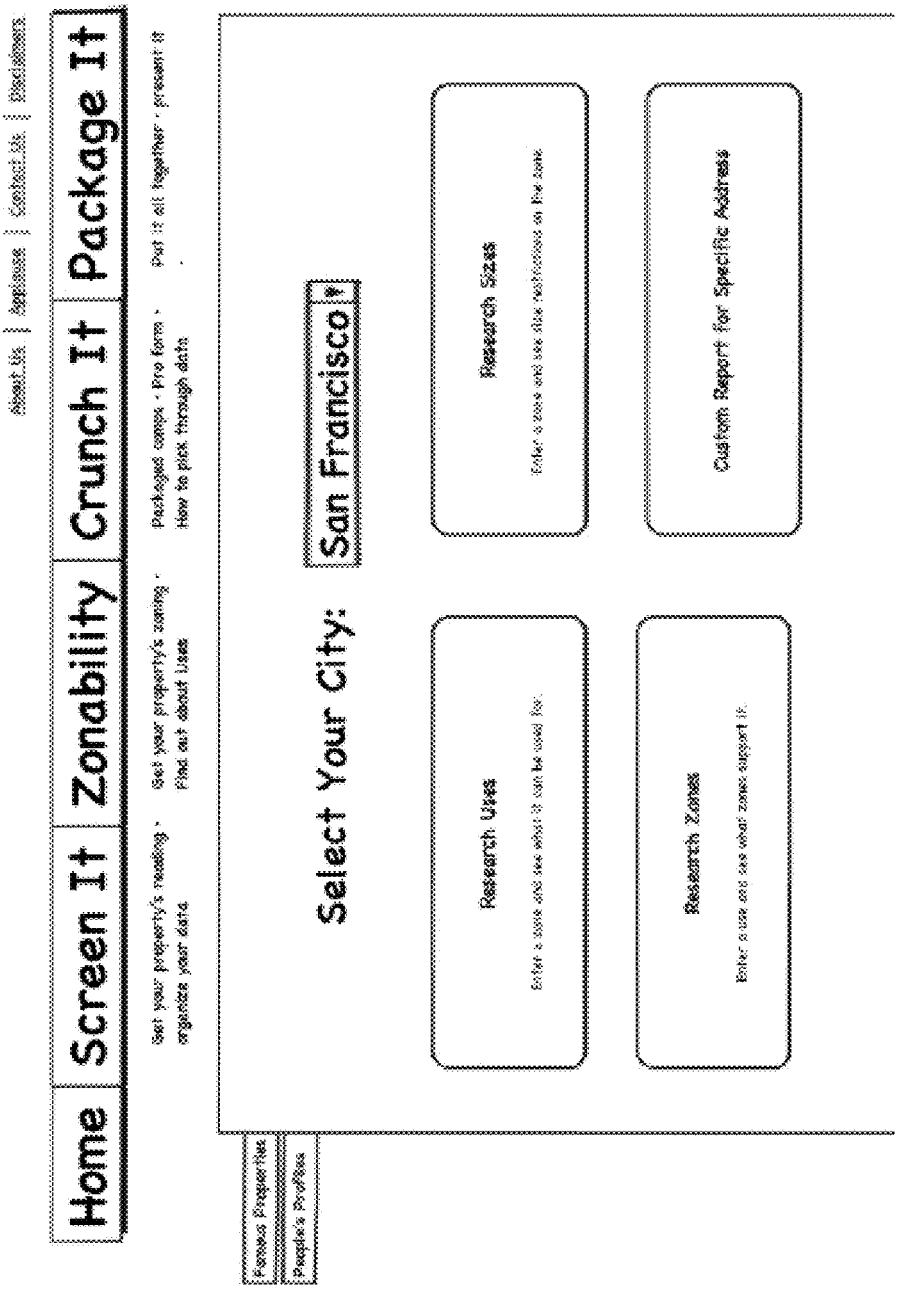
FIG 7—Shows screen shots in development for user to search database (excludes parking/signage/"watch use" and "watch code" list (www.DIYvalue.com and www.zonability.com)

Figure 8:
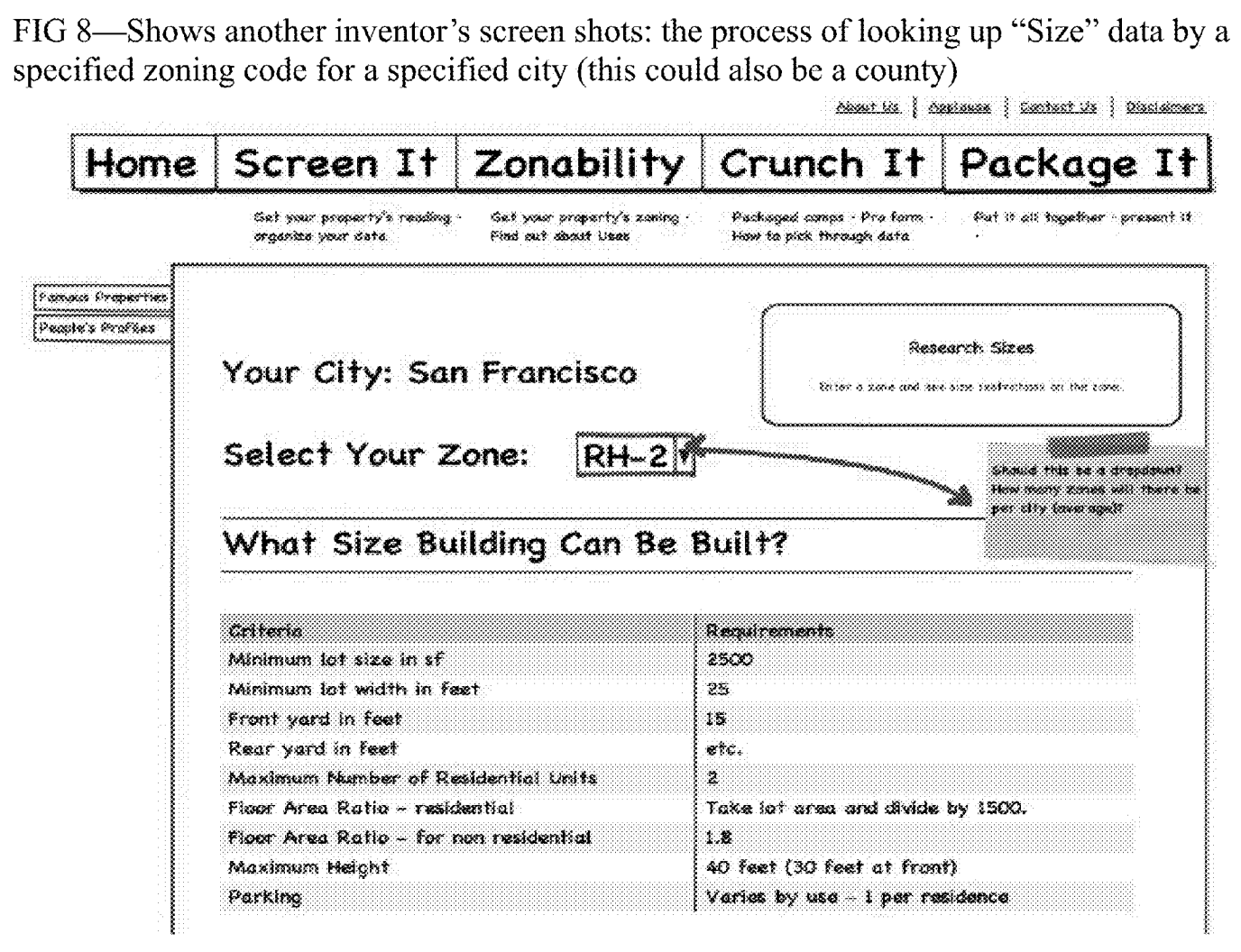

FIG 8—Shows another inventor's screen shots: the process of looking up "Size" data by a specified zoning code for a specified city (this could also be a county)

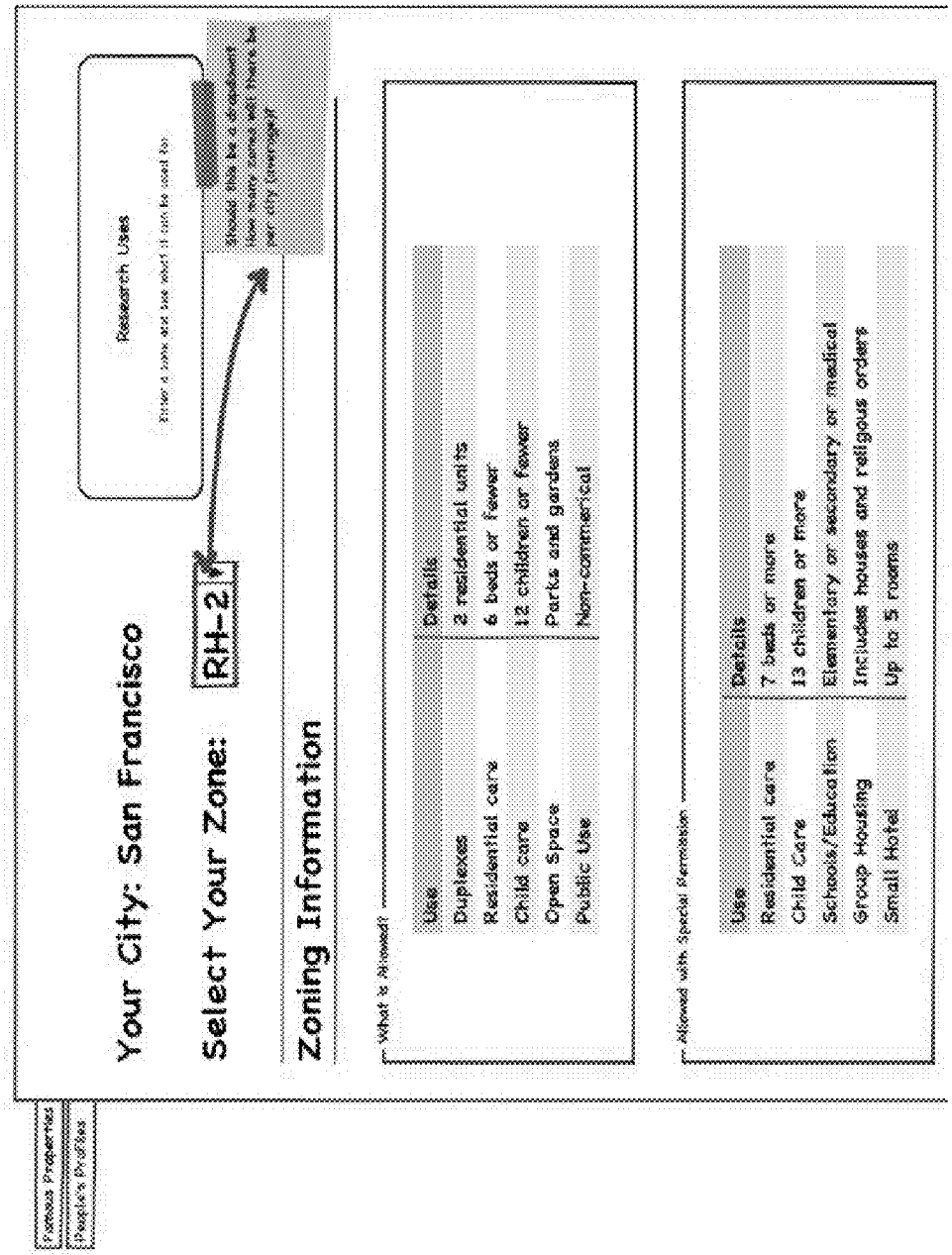
FIG 9—Shows inventor's screen shot showing process of looking up "Use" data by a specified zoning code for a specified city (this could also be a county)

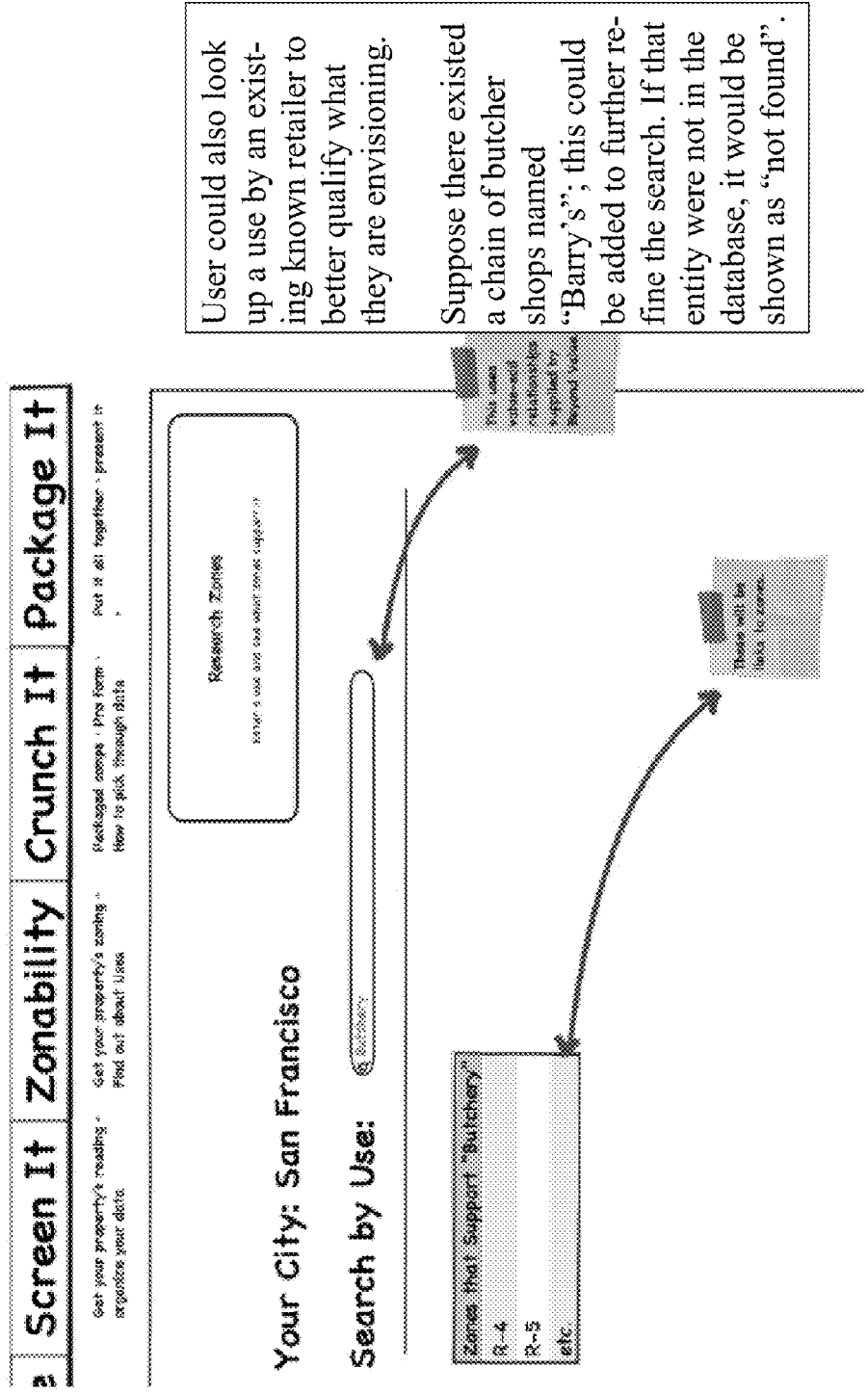
FIG 10—Shows process of looking up "Specified Use" and the results show what zoning codes allow that specified use (this does not show option for user to see list of uses by a specified "use category" as referenced in the patent "at play", "at work", "at home", "at gov")

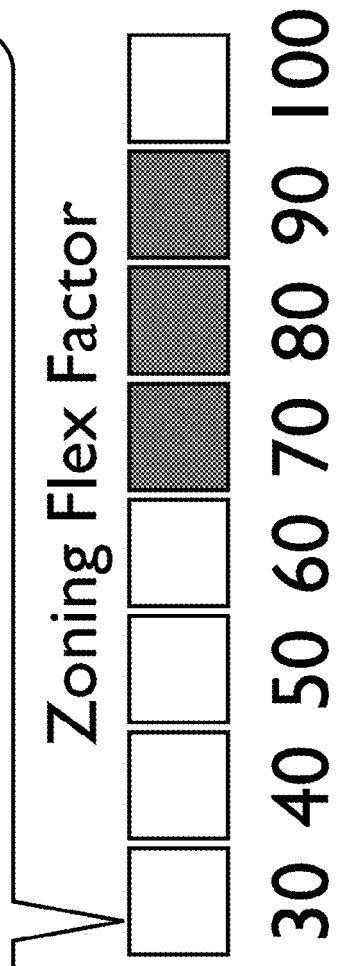
FIG 11 - Shows design for Zonability Flexibility Rating

FIG 12—Shows drawing for Zoning Score

The score is 0 to 100

90 to 100 is an excellent score   No roadblocks detected and possibly upside potential
75 to 89 a good score   Minor number of roadblocks detected/possibly upside potential
50 to 74 a moderate score   Suggests a few hurdles and no upside potential detected
25 to 49 a fair score   Suggests a few hurdles to jump through/some downside risk Necessary steps to create a Zoning Score
This relates to a specific property.
1. Set of development standard rules for a particular zoning code
2. List of uses permitted for a particular zoning code
3. Size characteristics with an emphasis on lot size, building heights, project density and overall size (floor area ratio—FAR)
4. Other physical traits including year built, last remodel, parking and construction type.

1. The Zoning Score generates automatically using available data.
2. The Zoning Score can change as the user interacts with the data.

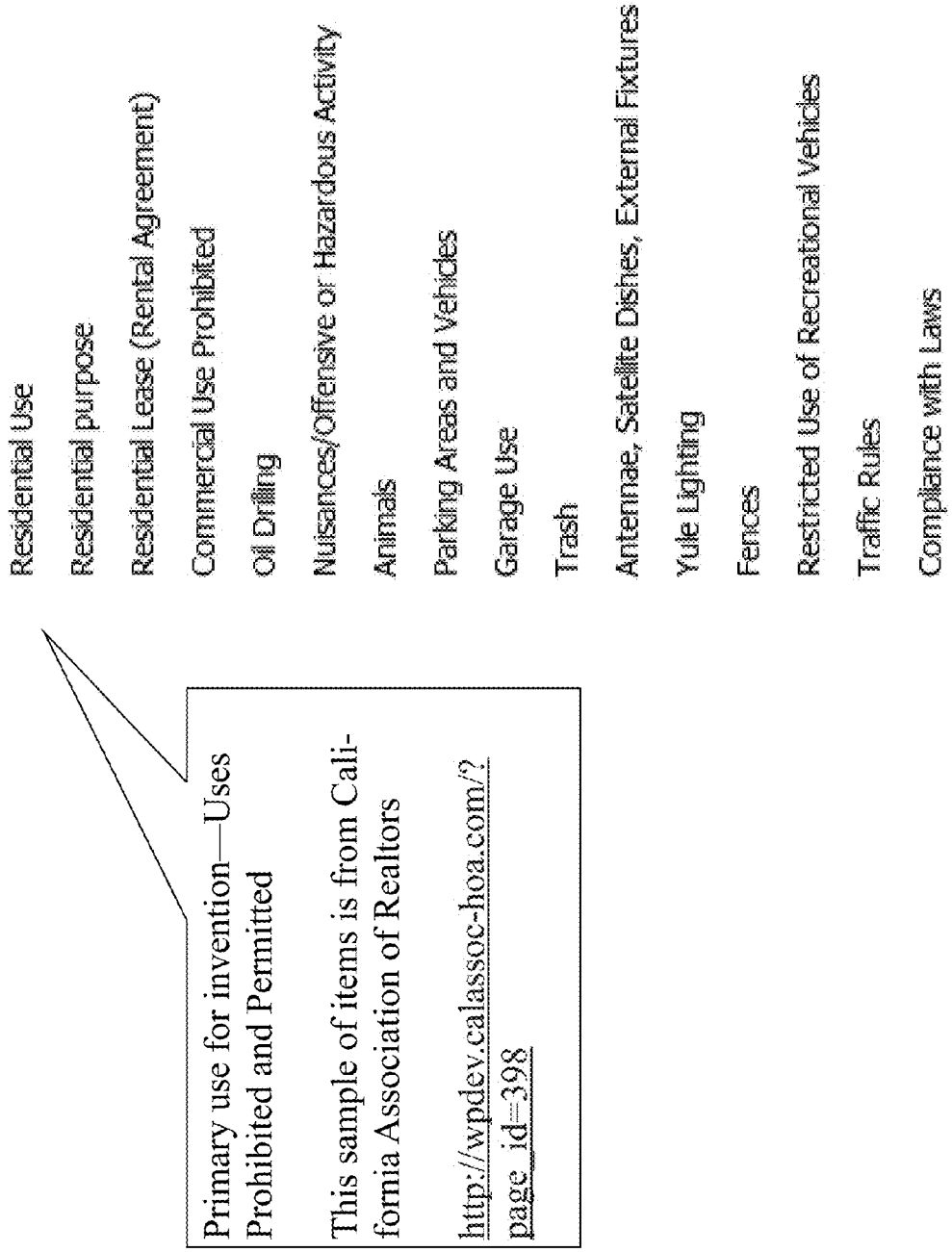
FIG 13—Shows a sample CC&R document and provides an example of the section relevant to this invention for data retrieval

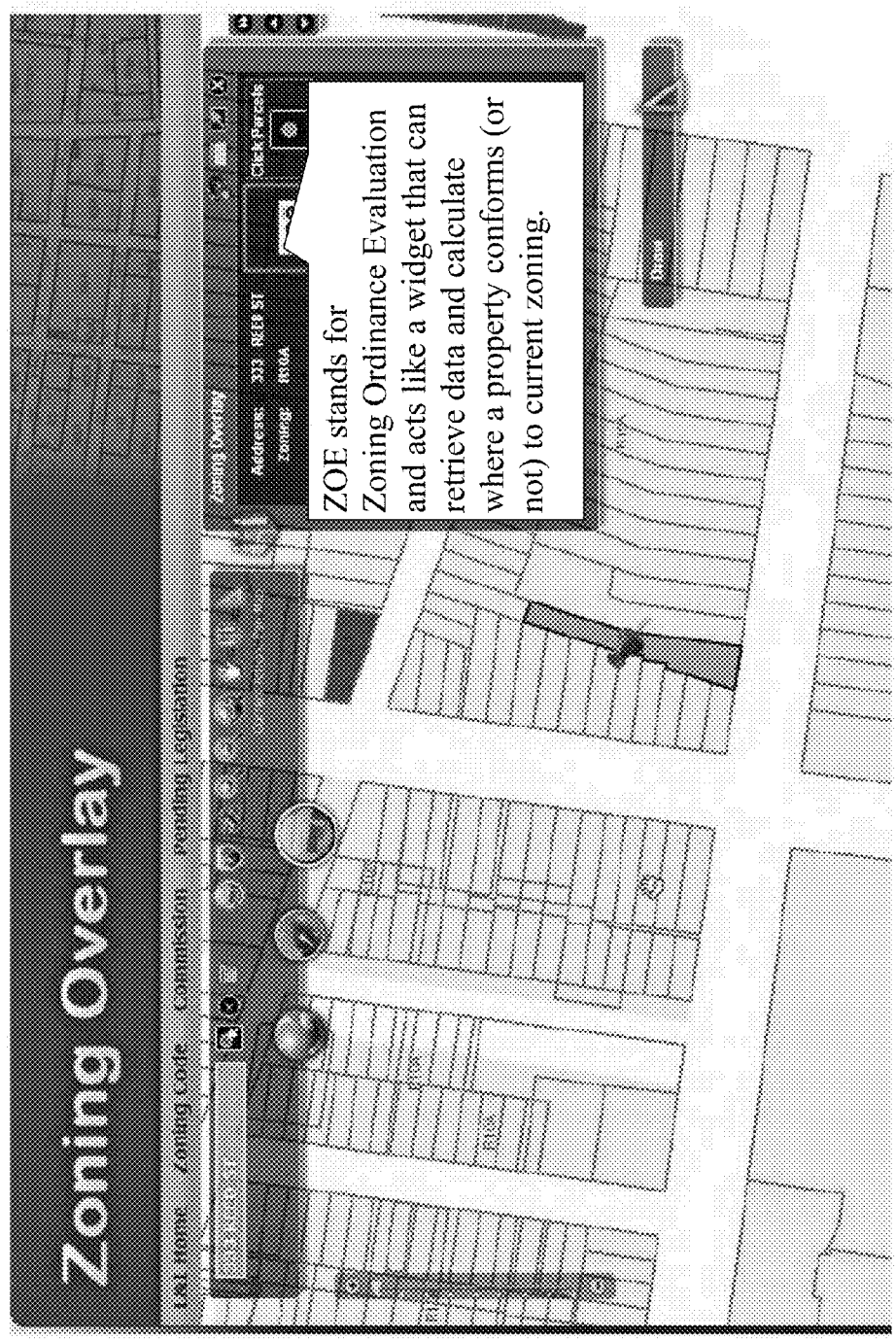
FIG 14—Shows how the invention could be used with existing sites using a widget or API application program interface FIG 15—Shows drawing for Size related output from the Zoning Code Rules

| What Is the Size Criteria? | Details |
|---|---|
| Minimum lot size | 5,000 sf |
| Minimum lot width | 50 feet |
| Front yard setback | none |
| Rear yard setback | 15 feet |
| Side yards setback | 5 feet |
| For multiple units: lot size per unit | 2,500 sf |
| Maximum House size | 0.65 |
| Coverage Ratio | 50.0% |
| Maximum Height | 32 feet |
| Parking | 2 per residence |

FIG 16—Shows drawing for Use related output

| What Is Allowed by Use? | Details |
|---|---|
| Single Family Home | n/a |
| Duplexes | 2 residential units |
| Home occupations | Restrictions on use/ employees/ license required |
| Residential Care | 6 beds or fewer |
| Small Family Child Care | 12 children or fewer |
| Accessory Uses | Limited size and location |
| Storage accessory | Restrictions on use/location |
| Open Space | Parks, gardens |
| Piers, docks, floats | For pleasure crafts – some restrictions |
| Utility lines | No details available |

FIG 17—Shows the internal calculation that uses a data provider, like GIS technology, or user entered data regarding the property's attributes such as lot size, house size etc. in comparison to the zoning code rules.

| What is the Size Criteria? | Details | Property | Result |
|---|---|---|---|
| Minimum lot size | 5,000 sf | 9,500 | Conforms |
| Minimum lot width | 50 feet | 80 | Conforms |
| Front yard setback | none | ? | |
| Rear yard setback | 15 feet | ? | |
| Side yards setback | 5 feet | ? | |
| For multiple units: lot size per unit | 2,500 sf | n/a | |
| Maximum House size | 0.65 | 0.23 | Conforms |
| Coverage Ratio | 50.0% | ? | |
| Maximum Height | 32 feet (or approximately 3 +/- stories) | ? | |
| Parking | 2 per residence | ? | |

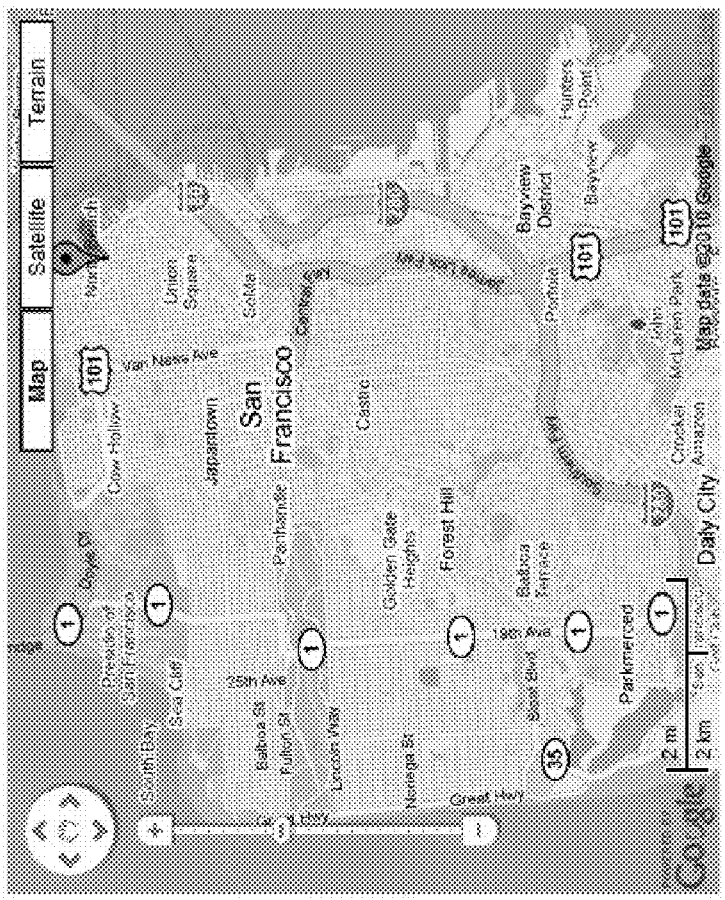
FIG 18—Shows screenshots using GIS technology—users enter in address

FIG 19a—Shows screenshots using GIS technology—clicking "details" provides extensive content culled from the database.

Address

| Street number: | 28 |
|---|---|
| Street name: | Prescott |
| Street type: | Ct |
| Zip code: | 94133 |
| Neighborhood (Planning) | North Beach |
| Neighborhood (Realtor) | Telegraph Hill |

Lot information

| Lot number | 0143030 |
|---|---|
| Lot area | 1300.23 sq. ft. |
| Land use | Residential |

FIG 19b—Shows screenshots using GIS technology—clicking "details" provides extensive content culled from the database.

FIG 20a—Shows screenshots using GIS technology—focus is to show sample of data culled from the database and the calculations referred to as Z.O.E. (zoning ordinance evaluation)

| Street number: | 28 |
| Street name: | Prescott |
| Street type: | Ct |
| Zip code: | 94133 |
| Neighborhood (Planning) | North Beach |
| Neighborhood (Realtor) | Telegraph Hill |

Lot information

| Lot number | 0143030 |
| Lot area | 1300.23 sq. ft. |
| Land use | Residential |

Zoning information

| Zone code: | RH-3 |
| Zone name: | House, Three-family |

FIG 20b—Shows screenshots using GIS technology—focus is to show sample of data culled from the database and the calculations referred to as Z.O.E. (zoning ordinance evaluation)

zoe

One-family dwelling
Senior citizens or physically handicapped housing - special rules - see City
Two-family dwelling
Three-family dwelling Restrictions

| | Name | Value | Unit |
|---|---|---|---|
| 1. | Minimum lot size | 2500 | square feet |
| 2. | Minimum lot width | 25 | linear feet |
| 3. | Floor area ratio (FAR) | 1.8 | floor area ratio |
| 4. | Density-lot size | 1000 | square feet |
| 5. | Setback - front | 15 | linear feet |
| 6. | Setback - rear | 0.45 | percentage of lot's depth |
| 7. | Setback - sides | 0 | linear feet |
| 8. | Open space | 100 | square feet |

FIG 20c—Shows screenshots using GIS technology—focus is to show sample of data culled from the database and the calculations referred to as Z.O.E. (zoning ordinance evaluation)

| | Restrictions | Outcomes* |
|---|---|---|
| | Name | |
| 1. | Minimum lot size | 1. Ok |
| 2. | Minimum lot width | 2. Ok |
| 3. | Floor area ratio (FAR) | 3. Ok |
| 4. | Density-lot size | 4. Ok |
| 5. | Setback - front | 5. Not ok |
| 6. | Setback - rear | 6. Maybe/maybe not ok |
| 7. | Setback - sides | 7. Ok |
| 8. | Open space | 8. Ok |

*Does the criteria conform or not to the zoning rules? Users will be able to override content to check data and the sensitivity.

FIG 20d—Shows screenshots using GIS technology—focus is to show sample of data culled from the database and the calculations referred to as Z.O.E. (zoning ordinance evaluation)

Address

| | |
|---|---|
| Street number: | 28 |
| Street name: | Prescott |
| Street type: | Ct |
| Zip code: | 94133 |
| Neighborhood (Planning) | North Beach |
| Neighborhood (Realtor) | Telegraph Hill |

Lot information

| | | |
|---|---|---|
| Lot number | 0143030 | |
| Lot area | 1300.23 sq. ft | |
| Land use | Residential | |

Zoning information

| | |
|---|---|
| Zone code: | RH-3 |
| Zone name: | House, Three-family |

| | |
|---|---|
| One-family dwelling | |
| Senior citizens or physically handicapped housing - special rules - see City | |
| Two-family dwelling | |
| Three-family dwelling | |

Restrictions

| | Name | Value | Unit |
|---|---|---|---|
| 1. | Minimum lot size | 2500 | square feet |
| 2. | Minimum lot width | 25 | linear feet |
| 3. | Floor area ratio (FAR) | 1.8 | floor area ratio |
| 4. | Density-lot size | 1000 | square feet |
| 5. | Setback - front | 15 | linear feet |
| 6. | Setback - rear | 0.45 | percentage of lot's depth |
| 7. | Setback - sides | 0 | linear feet |
| 8. | Open space | 100 | square feet | zoe

Outcomes*
1. Ok
2. Ok
3. Ok
4. Ok
5. Not ok
6. Maybe/maybe not ok
7. Ok
8. Ok

*Does the criteria conform or not to the zoning rules? Users will be able to override content to check data

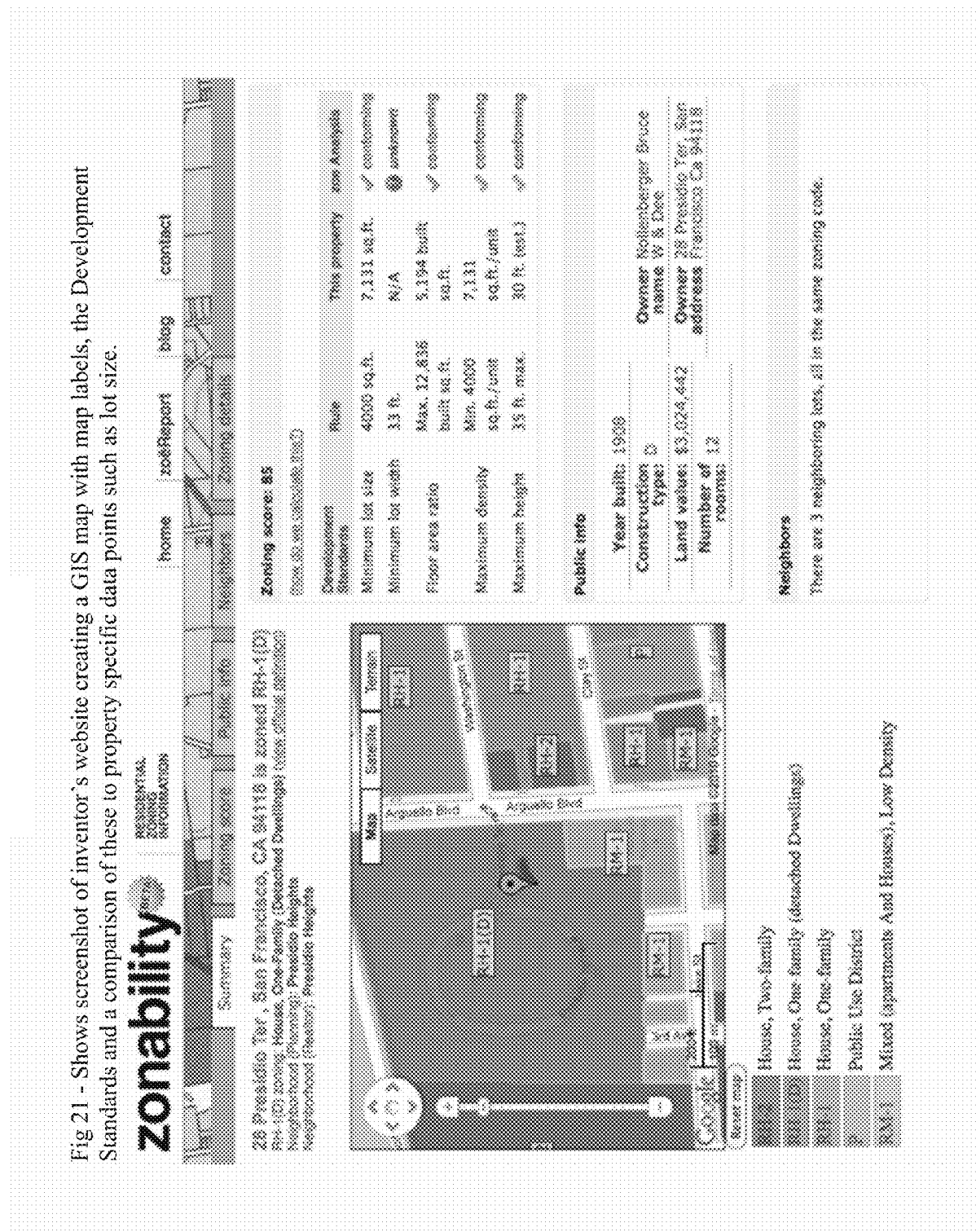
Fig 21 - Shows screenshot of inventor's website creating a GIS map with map labels, the Development Standards and a comparison of these to property specific data points such as lot size.

Fig 22 - Shows combination of screenshots from the inventor's website and data retrieval options "Specific to this zoning code" such as uses no longer approved San Francisco

| Zone: | RH-1(D) |
|---|---|
| Name: | House, One-Family (Detached Dwellings) |
| Description: | These districts are characterized by lots of greater width and area than in other parts of the City, and by single-family houses with side yards. The structures are relatively large, but rarely exceed 35 feet in height. Ground level open space and landscaping at the front and rear are usually abundant. Much of the development has been in stable tracts with similarities of building style and narrow streets following the contours of hills. In some cases private covenants have controlled the nature of development and helped to maintain the street areas. |

Zoning details

✓ One-family house, free-standing
✓ Housing designated for senior citizens
✓ Housing designated for physically handicapped
✓ Child care facility
✓ 6-bed care facility Specific to this zoning code
Zoning stats - percentage of properties zoned, average lot size, average building size
Variances - a list of addresses, as mapped, public record application information
Historic properties - a list of addresses, as mapped
Uses no longer approved in this zoning code
Conditional uses - a list of uses requiring special permission
Carbon trading opportunities and risks
Planning Commissioner outcomes - a list of addresses, as mapped

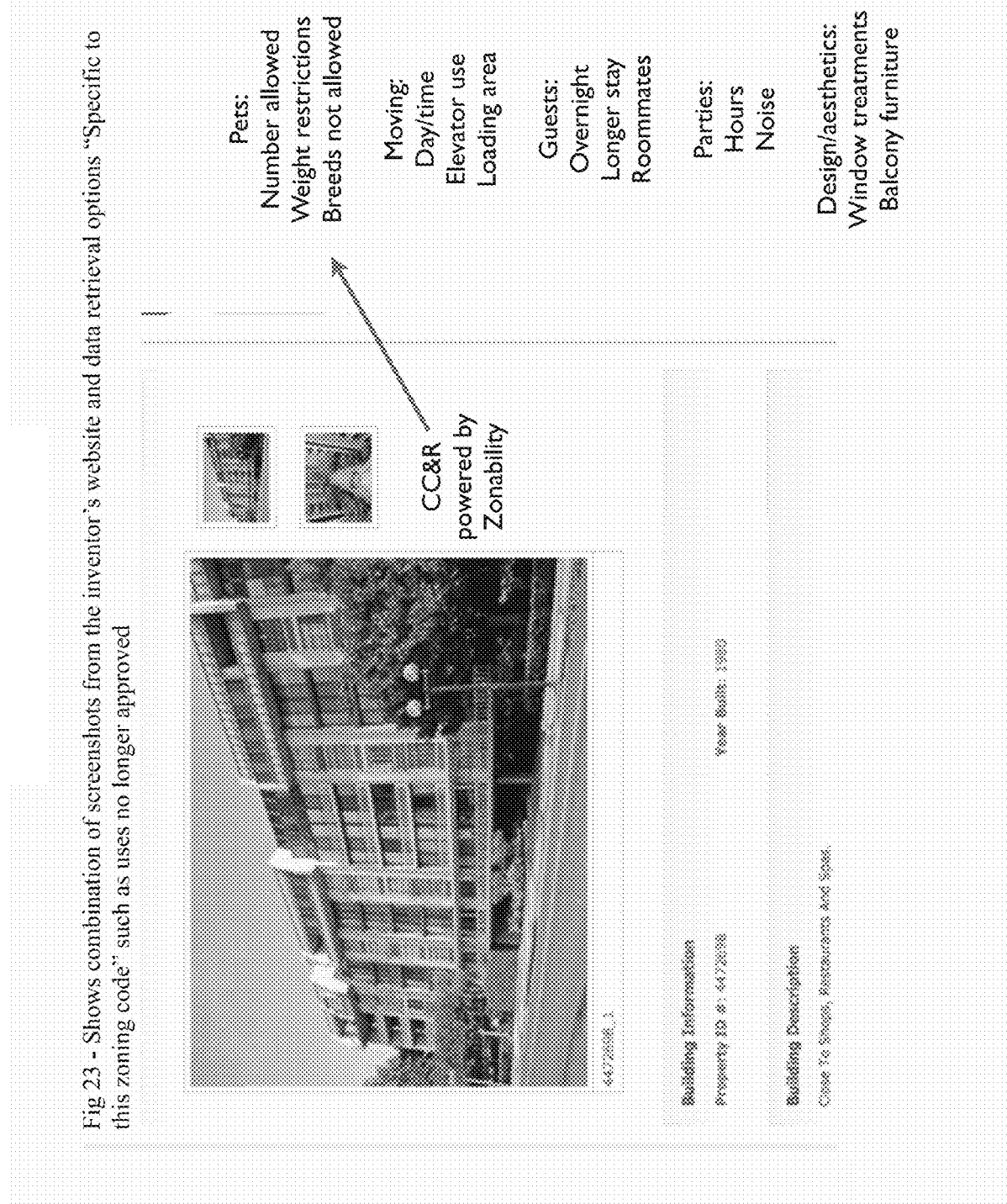
Fig 23 - Shows combination of screenshots from the inventor's website and data retrieval options "Specific to this zoning code" such as uses no longer approved Fig 24 - Shows examples of a pre-formatted email that creates a form allowing the Planner to click on answers - the idea is to improve the efficiency of communication.

Pre-populated Letter

Hello SF Planning:

I'm a potential (homebuyer, remodeler, business owner, renter, un-described) and want to get a firm understanding of the zoning impacts for:

22 Hancock Avenue, San Francisco.

Can you please confirm its zoning is:
RH-2 (yes, no - if no, please let me know other _____ );
Are there any overlays that impact it? (yes, no - if yes, please list/describe _____ ); and
Does the property how a historic status? (none, yes - if yes, potential natural resource, historic significance, landmark status, other _____ )?

Inquiry about What Might Be Possible:
in-law unit - Please let me know more about how to (add, legalize, remove) an in-law at this property.
new deck - What are the steps to build a deck approximately (2' feet or less, 2' higher or higher off the ground) and (_____ sf)
solar panels - What is the approval process to add solar panels (on the roof, other _____ )
change of use - Per zoning, how would this space work as a potential (store, restaurant, cafe, bar, urban farm, start up office, professional office, medical office, studio, residential unit, (blank) ); it was a (garage, store, office, residential unit, "not sure").

o Open field

Thank you for your assistance!

their name (optional)
email only

*This letter was generated on a mobile device.*

METHODS FOR THE TRANSFORMATION OF REAL ESTATE DATA TO PRODUCE USABLE DATA

BACKGROUND OF THE INVENTION (1) Field of the Invention

The invention generally relates to the development of real property. More particularly, the invention relates to creating data sets pertaining to particular parcels of real property based upon the particular needs of potential purchasers, sellers, renters, remodelers or developers of property.

(2) Description of the Related Art

The known related art comprises printed publications disclosing zoning regulations, municipal regulations, covenants, conditions and restrictions (referred to as CC&Rs), and maps showing zoning. The known related art fails to make zoning information readily accessible to a lay person attempting to engage in real estate acquisition, remodeling, analysis, development or other land use studies, analysis and future planning.

BRIEF SUMMARY OF THE INVENTION

The present invention overcomes shortfalls in the related art by presenting an unobvious and unique combination, configuration and manipulation of real estate related data sets, user defined criteria, and other sets of data. The present invention overcomes shortfalls in the known related art by, inter alia, presenting unique user interfaces, search methods, data structures and informational paradigms to assist a lay person in deciphering complex zoning codes and regulations. The invention presents unobvious combinations of components, search methods data organization and data transformation.

Certain embodiments of the invention may serve as a data manipulation and retrieval tool that transforms publicly available zoning ordinance data from cities and counties into a more user friendly structure by breaking down the data into individual data points and cataloging the formal names using commonly recognized names. Methods to measure the flexibility of a particular zoning code or classification includes a sub-component related to the rating of a city or county's practices as they pertain to the obstacles for obtaining a special use permit, a permit to remodel and the enforcement of their regulations.

In one embodiment of the invention, users may obtain needed information by requesting a specific data element or data grouping. The novel use of Geographic Information System (GIS) records may be used to provide a "ballpark" or rough estimate analysis regarding the zoning conformity to a user proposed use.

Embodiments of the invention include the following features:

Unique logic developed to form groups of data; visual guideposts to find look up functions using user need, use, size, building codes, addresses and other criteria; reverse direction of information retrieval; and the creation and measurement of a zoning code's flexibility or ease of obtaining conditional use permits, and/or variances.

Further embodiments include the creation of a Zoning Score to measure compatibility of proposed uses to certain sites and/or the conformity of existing improvements on the site and/or level of compatibility of a property's zoning considering adjacent properties; the creation of letters of verification for issuance from a city or county municipality to a user; and the creation of letters from users to a city or county municipality to request clarification or confirmation of a proposed use.

BRIEF DESCRIPTION OF THE DRAWINGS

FIG. 1 is a sheet of text demonstrating a cross-reference to another code section.

FIG. 2a is a table of code and zoning values.

FIG. 2b is a table of translations.

FIG. 3 is a table of zoning codes and permitted uses.

FIG. 4 is a table of zoning codes and various size requirements. lot

FIG. 5 is a table of zoning code information parsed by lot size restrictions.

FIG. 6 is a collection of tables with an example report of allowed construction for a given set of municipal restrictions.

FIG. 7 is a pseudo screen shot of one disclosed user interface.

FIG. 8 is a pseudo screen shot for the display of size data for a giving zone code.

FIG. 9 is a pseudo screen shot showing a look up of use data for a specified zoning code.

FIG. 10 is a pseudo screen shot showing a look up of specified use for a selected zoning code.

FIG. 11 is a chart demonstrating a Zonability Flexibility Rating and its related elements.

FIG. 12 is a table describing the steps needed to create one embodiment of a Zoning Score.

FIG. 13 is a listing of CC&R restrictions.

FIG. 14 is a pseudo screen shot showing an application program interface (API).

FIG. 15 is a table of information relevant to a set of zoning code rules regarding "size" restrictions.

FIG. 16 is a table of information comparing a set of zoning code rules regarding allowed "uses."

FIG. 17 is a table of comparison of user entered data to zoning code rules.

FIG. 18 is a pseudo screen shot showing one contemplated use of GIS technology with a user entered address.

FIG. 19a is a pseudo screen shot showing details from a use of GIS technology.

FIG. 19b is a pseudo screen shot showing allowed uses for a selected property.

FIG. 20a is a pseudo screen shot showing a sample selection of data generated from a GIS search.

FIG. 20b is a pseudo screen shot showing a sample selection of data generated from a GIS search that shows the zoning ordinance rules.

FIG. 20c is a pseudo screen shot showing a sample selection of data generated from a GIS search and related outcomes.

FIG. 20d is a pseudo screen shot showing a sample selection of data generated from a GIS search that combines all aspects—the look up by address, the zoning code, the rules and the outcomes.

FIG. 21 is a pseudo screen shot showing a GIS map with a Zoe Analysis.

FIG. 22 is a pseudo screen shot showing a data retrieval option.

FIG. 23 is a pseudo screen shot showing CC&R categories. These pertain to properties with shared common areas such as condominiums and master planned communities.

FIG. 24 is a sample letter generated by one embodiment of the invention.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

Referring to FIG. 1, a fly out box is shown and shows a reference to another code section. As various municipal code sections are referenced within other code sections, one feature of the invention is the inclusion of all referenced code sections in an analysis of proposed uses for a given property with a given zoning value.

Referring to FIG. 2a, a table is presented wherein property uses are delineated for individual look ups by a particular code or use and its approval rating by the code. For example, Principal Uses (permitted by right) and Conditional Uses (subject to commission or special approval) are presented to the right of three listed zoning districts.

Referring to FIG. 2b, a table of translations is presented. Terms of zoning code "use" information is presented next to lay categories that are understandable to lay people. The presented segregation of data allows for a reverse-directory search for data.

FIG. 3 presents a disclosed method of delineating Permitted Use and Conditional Use by zoning codes and specified uses such as Single Family Home. The "P" shows Permitted Uses and "C" shows Conditional Uses. The rows show specified uses and the columns show zoning codes. A unique data retrieval methodologies of an embodiment of the invention is the entering of individual uses into a database associated with multiple zoning codes.

FIG. 4 presents rows for zoning districts and columns for some of the size criteria used in zoning: lot size, floor area ratio and setbacks.

FIG. 5 presents one method of delineating zoning codes and lot size data upon a spread sheet that is entered into a database. Not only is the "lot size" data used but so are the other requirements such as "maximum height" for the building(s).

FIG. 6 presents a sample generated report using a disclosed method to a) show a comprehensive overview of the zoning code's basics (uses and size) and b) to check these requirements for a particular property. The goal is to check for uniformity. This specific property's data can be auto-filled from a third-party data provider such as public record data or the user can enter the data to show the property "as is" or to test various scenarios.

FIG. 7 presents a pseudo screen shot with a disclosed interface in facilitating a search of the disclosed data base, such a search might include (excludes parking/signage/"watch use" and "watch code.") The interface supports multiple views and pivot points to examine zoning code data. In various embodiments of the invention, a user, such as a non land-use expert, may focus upon on data retrieval as well as manipulation to add organization and greater comparability and comprehension of zoning codes and other building restraints.

FIG. 8 presents a pseudo screen shot of a provided process and interface comparing size data, specified zoning codes, for a specified city or county.

FIG. 9 presents a pseudo screen shot showing process of looking up "Use" data by a specified zoning code for a specified city or specified county.

FIG. 10 presents a pseudo screen shot of a disclosed process of looking up "Specified Use" and the results show what zoning codes allow that specified use. Additionally, the users could search by a brand name to find out what zoning codes support that use. This is geared primarily to help a business find a potentially suitable location. The system may also be used to communicate with the municipal planner to describe with "use" they are applying for.

FIG. 11 presents a Zonability Flexibility Rating chart. In one embodiment, the Zonability Flexibility Rating chart rates a specific zoning code en masse, not by a specific property. Elements that may be used to derive a Zonability Flexibility Rating include: prominence of zoning code in particular market, number of uses permitted by a particular zoning code, number of uses requiring a conditional use permit, size related rules, exclusions and exemptions, parking requirements, design review requirements, rebuilding options in case of destruction, bonus densities, energy efficiency requirements, and moratorium uses or encouraged uses for land.

FIG. 12 presents an explanation for one type of Zoning Score which reflects a specific property. FIG. 12 also presents one set of steps used to derive a Zoning Score. The Zoning Score may be auto-generated using available data. The Zoning Score can change as the user interacts with the data.

FIG. 13 presents a sample of CC&R restrictions sorted by categories. Such CC&R may be used to define uses that are prohibited or permitted. Such permitted and unpermitted uses may be collected by one embodiment of the disclosed invention and used for ascertaining permitted uses or the desirability of acquiring a property.

FIG. 14 presents a pseudo screen shot of how one embodiment of the disclosed invention could be used in a typical third party website as a widget or API (application program interface).

FIG. 15 presents a "size" related output for a selected zoning code. This table may be the product of an ancillary "size" widget that uses or works with one embodiment of the invention.

FIG. 16 presents a "use" related output for a selected zoning code. This table may be the product of an ancillary "use" widget that uses or works with one embodiment of the invention.

FIG. 17 presents a table of calculations derived from a data provider like GIS technology to target a specific parcel's data including it zoning code(s) and other attributes such as lot size, house/building size and other attributes.

FIG. 18 presents a pseudo screenshot using GIS technology wherein a user has been prompted to enter an address and wherein a user has received a "details" hyperlink to view further information regarding the entered address. Such details are shown in FIG. 19*a*, and include, lot number, land use, lot area and name of neighborhood.

FIG. 19*b* presents further "details" from the hyperlink of FIG. 18. Such additional details include content from a screenshot using GIS technology. The available "details" provide extensive content culled from a database such as GIS. database. Such details include allowed uses and other data elements. The GIS provides layers used to create unique interactive maps with zoning ordinance data and related data embedded. GIS maps manipulated with database data show percentages by use (residential, commercial, mixed, industrial public) by block, specified neighborhood or radius from a specified location.

FIG. 20*a* presents a pseudo screenshot using GIS technology and shows a sample of data culled from the database and the calculations using the development standard rules. The figure presents one embodiment of Z.O.E. also known as a "zoning ordinance evaluator" tool.

FIG. 20*b* presents another pseudo screenshot using GIS technology and shows another Z.O.E.

FIG. 20*c* presents yet another pseudo screenshot using GIS technology with a Z.O.E. showing the compliance or non-compliance with various zoning restrictions.

FIG. 20*d* presents yet another pseudo screenshot using GIS technology with a Z.O.E. showing the compliance or non-compliance with various zoning restrictions and showing lot and zoning information.

FIG. 21 presents a pseudo screenshot of one contemplated embodiment of the invention. This embodiment includes an interactive map that allows users to click upon either a map label for zoning information or to click upon a parcel to obtain further information such as zoning, code name, description or rules. These maps can be generated by neighborhood, block or a radius from a specified location.

FIG. 22 presents a pseudo screenshot of one contemplated embodiment of the invention, featuring Zoning Details a function with the ability to organize data by zoning code including peripheral data relevant to understanding the impact of zoning such as the number of properties zoned, the average lot size and building size (in comparison to the zoning code rules), the variances, planning commissioner meeting notes and other data elements. This data can be made mobile through the creation of a widget or API.

FIG. 23 presents a pseudo screenshot of one embodiment of the invention use to evaluate condominiums, one example of a use that has Covenants, Conditions and Restrictions.

FIG. 24 presents an example of a pre-formatted letter allowing a city or county planner to select answers to save time. The invention includes embodiments wherein reports are automatically generated by use of the disclosed system.

Multiple Utility of the Various Embodiments of the Invention

Zoning is the "open sesame" of real estate and yet the existing methodologies to obtain such pertinent data are buried in cumbersome zoning ordinances or similar property related such as covenants, conditions and restrictions. This invention removes the need to go through this time consuming process and allows the user to look up specific information requested as it relates to size, use, parking, signage, code summary and a specific property's information as well as various related municipal ordinances such as "green ordinances".

Data once retrieved can be exported into a printed report format or into a .cvs format. Methods, developed as a result of the research conducted in analyzing zoning code data, provide the basis for a Zoning Flexibility Rating which reflects the rating for a zoning code based on a variety of variables. The Zoning Score in one version, is based on a per property basis and focuses on signifying if the property appears to be conforming or non-conforming as well as projecting upside potential or downside risk using either public record data or user provided data. Other versions are by perspective (such as buyer, remodeler, renter, investor, seller) neighborhood or geographic area. The invention includes the ability for users to iterate using a pre-programmed calculator based on the zoning rules and includes web-based and mobile APIs.

Covenants, conditions and restrictions (referred to as CC&Rs) are widely used for condominiums, master-planned communities and planned-unit developments—all of which share the need to describe the rights and duties of the owners. While they differ from zoning in that the contract is between private parties rather than a government enforcement agency, the same principles apply to developing a data retrieval tool.

Embodiments of the disclosed invention include methods of segregating data. Embodiments of the invention include data mining and information retrieval within the typical labyrinth of zoning regulations and optionally pairs it with data providers like Geographic Information System (GIS), considered a public record source, to identify a property's zoning code (s) and retrieve criteria to assist in ascertaining if the property meets conformity standards. The availability of GIS allows for the creation of "Interactive Zoning Maps" which combine the zoning code abbreviation, description, rules and other available property specific information. Users can click upon a zoning map label or parcel outline to obtain information. Embodiments of the invention work with additional zoning and land-use related data such as variances, transcribing planning commissioner meeting notes, historic districts, and other factors to add to information to either a specific property or to a zoning code. Embodiments of the invention include a "distance to" aspect detailing zoning and code use allowed or not allowed within a specified number of feet from the subject property.

Terms and Definitions

In describing the various embodiments of the invention the following terms and definitions are sometimes used:

"Action-oriented" use categories include: "at work", "at home", "at play", "at gov".

Classification: zoning designation

Code: same as classification, it is a way to identify a zoning type

DIY value: one of the various names of the invention, sometimes used as "do it yourself valuation."

Effort: refers to the number of steps needed to be taken prior to submittal of documentation to the city or county to request a use that requires a conditional or special use permit and/or permit to make physical changes to the property that require building permits.

"Everyday Recognition" adds well-known brand named that people can identify so as to make the type of use and size understood.

Friendly use descriptions: conversion of 'expert' terms to make understandable to the layperson Nomenclature translation and explanation—real estate terms include square feet (sf), floor area ratio (FAR). Embodiments of the disclosed invention seek to level the playing field in the user's comprehension by offering conversion of the uses. Examples include the use "hotel" which in some zoning codes is labeled as "transient habitation".

Reverse directory: concept of being able to retrieve information from multiple perspectives Size: refers to development standards that include such things as minimal lot size, maximum number of stories, and density levels that refer to number of dwelling units per square foot of a lot size.

Time: refers to the actual time in days or months once required documentation concerning obtaining a use permit or building permit is submitted.

"Traditional" use categories include: "retail", "industrial", "office", "residential", "other"

User-friendly rating: scale that rates ease, cost and convenience to the property owner or renter relative to obtaining proper permissions to use a property.

Use: refers to activities: residential and businesses

Watch list encompasses property types (by use) or related to size or some other characteristic that need to be recognized as either being no longer allowed, being allowed but only with conditional use permit or the reverse—uses that were once subject to a conditional use permit no longer are or those uses that were not permitted even with a conditional use permit but now are either with or without a conditional use permit.

Zonability: sometimes used to describe embodiments of the disclosed invention.

Zoning Calculator: refers to the development of a series of pre-set formulas developed by a specific zoning code to mimic the rules. Users can add variables such as lot size, building size, etc. and get feedback as to whether or not such imputed variables meet the preset rules and can show how this impacts the property's Zoning Score.

Zoning Flexibility Rating: a method that measures the appeal of a zoning code or classification based on its uses permitted, scale of sizes permitted and other pertinent data points.

Zoning Score: a measure for a specific property as to its likely conformity or nonconformity per the zoning rules and/or level of compatibility of a property's zoning considering adjacent properties and/or a measure of upside potential and downside risk. Data about the property is from a public record source. Users can add and edit data to see a revised "user generated" Zoning Score. A Zoning Score may also be considered a measurement the specified property conforms to the current zoning (or not) based on available data that includes public record and/or user added. The tool is able to indicate potential upside based on a series of calculations or downside risk. Upside potential would signify room to expand while downside risk suggests an overbuilt situation.

Further Details of the Various Embodiments of the Invention

In one embodiment of the disclosed invention, a quick glance feature or the composure of a Zoning Score may be composed by use of the following criteria:

By Use(s) to find the zoning classifications which allow for XYZ, or proposed uses of the property:

This can be general use (retail, residential, industrial, office, mixed)

Specific use (examples: dress store, barber shop, auto dealership)

Logic by grouping

Download option/report option

By Size to find the zoning classifications that allow for XYZ:

By minimal lot size

By Floor Area Ratio (or density)

By Maximum Height (or # of stories)

Logic by groupings

Download option/report option

By Zoning Classification or Code provides a summary or overview with an option to add a specific property to "test" its conformity or nonconformity based on basic principles such as:

Minimum lot size

Uses

Number of Stories

By Specific Property relies upon linking an address with a zoning code(s) that provides an overview of the property's zoning per publicly available data. This includes showing:

Zoning Code Name and abbreviated Name

Zoning Code Definition

Permitted Uses

Conditional Uses

Developmental standards

By Zoning Score, as defined above.

Examples of Embodiments of the Invention

Example 1 a business owner wants to open up a clothing store in an area and is considering a few cities but doesn't know which zoning allows for "retail—women's apparel". By using Zonability's technology, the user would enter the search for "retail" in the primary field, "women's apparel" or "dress store" in the secondary field to find a printout of zoning codes in a specified city or county that matches those uses requested.

Example 2 a user could use this invention to see uses by category such as "at work" and opt to select a zoning code or not. Either a single city or multiple cities can be selected. Example 2a. shows if the user specifies a zoning code and a specific city.

2a. Uses "At Work"—for specified zoning (C2) in (San Francisco)
Office—yes
Medical office—no
Manufacturing—no 2b. Zoning Codes for Uses "At Work" for specified city/county (San Francisco) but does not specify a zoning code so all "at work" uses will return.
C2—office, bank, insurance agency
M1—office, school, manufacturing, auto repair
C3—medical office Zonability offers a reverse directory concept so a user can look up by the end result desired or by code. This is the logic and an example for "Uses"

At home—housing, pet related (boarding), child related (day care facilities), religious, boarding homes, accessory buildings At work—office, schools, manufacturing, medical offices, bank, insurance agency, police, private school, Laundromats, auto repair At play—restaurants, retailers, entertainment, gyms, museums, parks, media, café, clubs, hotels, produce market, personal care At gov—this is the catch all category for such government buildings, institutions, parks, Rotary club, hospitals Some uses that cross between the 4 or so categories can be classified in two of the three. A park may be "at play" or "atgov".

Regarding "Size", this invention allows users to look up information either by floor area ratio (FAR), minimum lot size, or number of stories.

Reverse directory concept—example for "Size"

Users select the City and/or County.

Then, the user selects "Size" choice to search for specific data with pull down menu to select ranges sought for one of the three:

Floor area ratio (FAR)—pull down options with data range (1.0 and less, 1.0 to 2.0, 3.0 to 4.0, 4.0+)

Minimum lot size—pull down options with data range (2,000 sf and smaller, 2,001 to 4,000 sf, 4,001 to 6,000 sf).

Maximum number of stories—pull down options (1, 2, 3, 5 and under, 5 to 10, 10+)

The database shows the zoning classification that meets the criteria that matches. So, if a user wants to know what zoning allows for a high FAR, they might select the range (4.0+) and the result would show the corresponding zoning classifications that allow for FAR of 4.0+.

Example 3

City—San Francisco
Size Choice—FAR and 4.0+
Results:
RC-4
C-2-1
C-3-O
C-3-R
Other Look Ups:
By Code: Logic/Example Zonability has taken zoning code information by assigned zoning classification (by the jurisdiction) and created a user friendly summary of the pertinent data based on the notion of satisfying the more common zoning needs.

Example 4 a user could get an aggregation of data regarding a particular zoning in the form of a widget. The zoning code, abbreviation, definition, a set of rules regarding development standards and lists of approved uses as well as conditional uses. The invention takes that zoning information that is shown on line and refers to multiple sections within the Code to show Size and Use information in a summary format and following the same concept of layperson language.

Example 5 this invention allows prominent sections of other municipal ordinance such ordinances as the "Green Ordinance". The data is taken from the ordinance and allows for data retrieval—Chart 1 shows a synopsis of the data collected. Users can ask "what properties are impacted by the Green Ordinance". Answer: New construction, some remodels. Or, how many points are required for 4-plexes? Answer: 50 for this year.

CHART 1

| Mkt | By type | By project | Points by 2010 | Points by 2011 | Points by 2012 | Storm water mgmt? |
| --- | --- | --- | --- | --- | --- | --- |
| San Francisco | 4 units and less | New, some remodels | 50 | 50 | 75 | Yes |
| San Francisco | 5+ units and/or mid-rises | New, some remodels | 50 | 50 | 75 | Yes |
| San Francisco | 5+ units and/or high-rises (75+ feet) | New, some remodels | LEED Silver | LEED Silver | LEED Silver | Yes |

Example 6 a user could get an aggregation of data regarding zoning. The zoning code, abbreviation, definition, a set of rules regarding development standards and lists of New requirements for buildings to meet compliancy standards (this includes meeting Green Ordinance standards).

Ability to model hypothetical changes to a property using Green Ordinance guidelines and recalculate its carbon impacts.

CHART 2

| List of animals - SF County | Ok in R-zones? | Is a local license required? | Dept. | Qty. limits | Other requirements 1 | Other requirements 2 |
|---|---|---|---|---|---|---|
| Horses | | Yes | Dept. of Public Health | 1 | Stable is required | Neighbor input considered. |
| Cattle | No | | | | | |
| Sheep | | Yes | | 1 | Stable is required | Neighbor input considered. |
| Goat | | Yes | Dept. of Public Health | 2 | Stable is required | Neighbor input considered. |
| Poultry | | Yes | | | "4" is the maximum number of animals (dogs, rabbits, cats, chickens, gerbils). | Must keep in coops or enclosures - 20-foot requirement from residence. |

By A Specific Address: Logic/Example

An address can be requested for a zoning look up. This is an extra step to the basic invention but data providers exist that links addresses to zoning classifications. The same steps outlined in "By Code" are done. Please see steps outlined in this Look Up.

See FIG. 6 Shows sample report with method to compare a particular property's check for conformity—this relies on using a public record source namely GIS, a widely recognized source for providing information like this and is often times open to the public to use in software applications.

Other Look Up & Data Retrieval Options
Parking to find ratio of required parking:
By zoning classification or code
By such words as "none"
By specified ranges
Download option/report option
Signage to find rules by asking to retrieve information:
By zoning classification or code
By use
By size (specify range that includes billboards)
Zoning Download option/report option
Zoning in Transition—By product is a "watch list"
"Uses" no longer approved (by city/county, by use, by zoning classification)
"Uses" recently approved (by city/county, by use, by zoning classification)
"Uses" moved to "special permission" category (by city/county, by use, by zoning classification)
Down zoned properties—list by address
Rezoning—list by address
Proposals to change policy within zoning code
Carbon Trading Impacts Embedded in Zoning
Uses no longer approved (by city/county, by use, by zoning classification)
Uses recently approved (by city/county, by use, by zoning classification)
Uses moved to "special permission" category (by city/county, by use, by zoning classification)
New requirements in process for obtaining use permits Market vs. Property energy use (gas, electric, water) as well as calculated output based on size characteristics and market benchmarks.

Ability to know the percentage of properties within a zoning code that exceed limits set for emissions.

Zoning Impacts—peeling away layers of data available on a per parcel basis:
Historic significance
Variances
Zoning as a Consumer Protection Issues—a disclosure
Given the weight of zoning on property rights, potential property buyers may want a formal disclosure to be issued at the time of purchase.

Pre-zoning Notification—overview of the process:

A property owner wants to change something that will impact the property's appearance and/or use. The zoning process requires public notification in order to gather outside feedback and weigh what is being requested to what has already been approved in the past under similar conditions.

Using this invention, property owners can create their own notification to let those within a specified distance know about potential plans to alter a property and to gather feedback as well as attempt to generate some consensus building.

Posting photos of similar projects, uploading conceptual drawings/plans, showing analysis for how the plan works with the current zoning—essentially providing a way to explore the natural process that already happens when submitting a plan requiring public approval on a small scale.

The present invention overcomes shortfalls in the known related art by presenting unobvious and unique methods of breaking down zoning code information that is written in either a sentence structure, table format that references other sections of the code and creating individual fields of the data. By breaking down the data, this allows each piece to be viewed individually and allows for users to retrieve specific information as well as it allows for the grouping of data.

This invention also allows for the export of the data in either a printed report format (PDF) and/or a spreadsheet (.cvs) format.

Side-by-side comparison of zoning—this would allow users to see what are the differences between various zoning codes and/or properties.

Measuring the zoning code's flexibility can add insight into the value of a property's location.

Providing a Zoning Score gives context to the way a property property's conformity or non-conformity Linking an address with a code and providing a calculation to see where the property conforms or not. This relies on a data such as GIS.

Combining the zoning ordinance data with other related data including carbon trade requirements, a building code issue, whether generated through automation or input by user can deliver a more robust and complete picture of a property's liability as it relates to some government controls.

Segmenting relevant CC&R data for a specific building, complex or master-planned community allows for easy data retrieval regarding rules and financial issues included in the CC&Rs such as a) pet policy b) process to make changes to a unit c) hours of operation d) financial health of the Association e) inclusion of expenses in the dues. Other relevant issues that apply to a broad audience of existing owners and potential buyers could be included in this list.

One of the main advantages of this invention is that is makes something currently obtuse to a layperson practical and "user friendly". The rating and scoring system put a measurement to a process or concept that currently doesn't have one currently, adding to the user's comprehension.

Unexpected results include:

Additional search engine criteria to be used to find property

Interactive Zoning Map

Auto-generation of Letters of Verification

Economic Development Department tool to match "use" with available space

Infill Housing

Zoning Flexibility Rating

Zoning Score

Carbon footprint tie-in with Green Ordinance

Covenants, Conditions and Restrictions (CC&R) data retrieval

Zoning Index—standardized access to zoning codes over a myriad of local governments Monitoring, Communicating, Searching, Data layering 1. Zoning Flexibility Rating: the creation of a standardization system for rating zoning flexibility based multiple layers of data.

Steps Necessary to Create a Zoning Flexibility Rating

Step 1: Prominence of zoning code in particular market

Step 2: Number of uses permitted by a particular zoning code

Step 3: Number of uses requiring a conditional use permit

Step 4: Size related rules with an emphasis on density and FAR

Step 5: Exclusions and exemptions based, in part, on the number of other sections within the code referenced.

Step 6: Parking requirements

Step 7: Design review requirements

Step 8: Rebuilding options in case of destruction

Step 9: Bonus densities

Step 10: Energy related controls through such options as a "Green Building Ordinances" and/or reporting requirements for energy use, used for carbon footprint calculations.

Step 11: Moratorium uses/encouraged uses

Objectives: A Zoning Flexibility Score provides a way to measure scarcity for an existing stock of buildings as well as to project future opportunity based on the zoning for vacant land.

2. Zoning Score: creating of a score to indicate what a property's zoning is relative to the existing (or planned) project.

Steps Necessary to Create a Zoning Score

Step 1: Set of development standard rules for a particular zoning code

Step 2: List of uses permitted for a particular zoning code

Step 3: Size characteristics with an emphasis on lot size, building height, project density and overall size (floor area ratio—FAR).

Step 4: Other physical traits including year built, last remodel, parking and construction type.

Objectives: A Zoning Score provides a 0 to 100 score articulating the degree to which a property appears to be conforming to the existing zoning code rules as well as provides for upside potential, which would be the case for a small house on a large lot that could (per the zoning code) be theoretically 50% larger in size. It also measures the downside risk, an example might be a four-plex in a zoned area for only single family homes.

The formula:

Each development standard from the local zoning code is procured.

The initial set of calculation is to measure the public record data with the zoning code rule.

A determination is made if the property appears to meet the code requirement. For each market the data is set to allow for a margin of error. An example is lot width. The zoning code might specify 25 feet. The margin for error may be set, for this variable, to be within 3 feet based on the market's averages.

For properties that appear to be undersized, the results show "room for potential expansion". However, this invention models the intent of the zoning rules. For instance, if a property is only one-story while the maximum height for that zoning allows for a two-story structure but the building size exceeds the amount allowed then this invention will show results similar to "this property appears to be at its maximum size based on its square footage."

Other examples might be for a property with adequate attributes that appear to meet the development lot standards except for parking. In such an instance, this invention will show results "property appears to be conforming except for the parking requirement."

The following charts (Charts 3-5) show the sequence of how data is used for the Zoning Score, a key part of this invention. Based on the development standards criteria such as lot size, width etc. each variable is weighted. This weight is developed from a) availability of public data b) importance by market.

The User Zoning Score includes data added by the user. This invention includes the preset calculation functions to measure the likelihood the property conforms or doesn't and potential upside potential as well (expansion potential) and downside risk (signaling overbuilt conditions).

The 2nd column shows how the zoning ordinance evaluator rates that data by level of importance which is pre-set by market. The 3rd column is used for the user-generated Zoning Score and reflects the rating system, again by market, for each criteria.

CHART 3

|   | Data point | Level of importance - Zoning Score | Level of importance - User Zoning Score |
|---|---|---|---|
| 1 | Minimum lot size | High | High |
| 2 | Minimum lot width | Moderate | High |
| 3 | Floor Area Ratio (FAR for short) | High | High |
| 4 | Density - lot size per Residential Unit (Equals Maximum # of Residential Units) | Moderate | Moderate |
| 5 | Setbacks - front | Low | Moderate |
| 6 | Setbacks - rear | Low | Moderate |
| 7 | Setbacks - side 1 | Low | Moderate |
| 8 | Setbacks - side 2 | Low | Moderate |
| 9 | Open space | Low | Moderate |
| 10 | Height in Feet | Moderate/Low | Moderate |
| 11 | Parking | Moderate/High | High |

Chart 4 shows how the programming assigns a "true" for meets zoning rule or "false". It also shows the flexibility within the pre-set calculations for variables such as lot size which the user can override, meaning edit for the user generated Zoning Score.

4. CC&Rs Data Retrieval

Every condo unit, townhouse or restricted property such as those found in senior master-planned communities have an additional set of rules and regulations. While the local zoning ordinance supersedes the CC&Rs, knowing the rules within the CC&R document is important for maintaining a harmonious and well-functioning community.

This invention uses a similar technique outlined for data retrieval. The emphasis is breaking down the CC&R document so that users can easily do look ups regarding such things as owning pets, what can go on the balcony, window coverings, hours for construction, what is included in the Association dues, financial health of the Association, next Association meeting and current leaders' contact information.

5. Zoning Index—Standardized access to zoning codes over a myriad of local governments This invention allows for analysis of zoning codes from different local governments—those within close proximity, similar in population, location etc. The ability to perform this kind of analysis warrants the creation of an Index, one that measures current, historical and projected performance. Questions that can be answered include: What do the local government's most popular zoning indicate? Stability. Consistency. Transparency. Exemptions. Restrictions.

CHART 4

|   | Data | RULE per zoning: Conforming lot size | ASSESSOR DATA: Lot size in sf (user can override size) | OUTCOME | RULE per zoning: Conforming lot width | ASSESSOR DATA: Lot width (user can override and/or GIS) |
|---|---|---|---|---|---|---|
|  |  | 5000 Formula: RULE = or > than Assessor size | 4500 | TRUE | 25 Formula: RULE => than Assessor Lot Width | 25 |
|  |  | OUTCOME |  |  |  |  |
| Minimum lot size | 5000 | TRUE |  |  |  |  |
| Floor Area Ratio (FAR) | 1.8 |  |  |  |  |  |
| Density lot size (sf)/unit | 500 |  |  |  |  |  |
| Setback - front | 10 |  |  |  |  |  |
| Setback - rear | 25 |  |  |  |  |  |
| Setback - side | 0 |  |  |  |  |  |
| Parking/unit | 2 |  |  |  |  |  |
| Minimum lot width | 25 | TRUE |  |  |  |  |
| Max height in stories | 3 | TRUE |  |  |  |  |
| Minimum lot size |  |  |  |  |  |  |

3. Carbon footprint tie-in with Green Ordinance

The adoption of Green Ordinances by communities is like any other zoning ordinance in terms of its control and directing for how people use their properties. Each community's Green Ordinance can have different sets of regulations that give local government controls. Using the same data retrieval methodology regarding zoning codes, a user can find out when, where and how the Green Ordinance impacts a property.

Furthermore, benchmarks set by a community can be included in the data to acts as a comparison for a specified property's current energy performance. Given the invention's design to pre-set calculations using the local Green Ordinance, users can run scenarios showing how improvements in energy efficiency change the property's carbon footprint.

6. Monitoring, Communicating, Searching, Data layering

This invention allows for monitoring of both a local zoning code as well as by specific property.

It opens the channel for communicating between citizens and government agencies using the API, a bi-product of this invention, or through a customer relation manager using pre-programmed questions.

Searching for properties by a specified "use" as found in a zoning code ordinance is unique.

Data layering reflects adding other sources of geo-coded data to further enhance what is allowed, restricted or being decided as well as inquires received regarding a property's zoning (these could be variances denied or approved, proposed uses or changes, previous zoning or restrictions.)

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

Items

The invention includes, but is not limited to various items as described herein.

Item 1. A method of transforming data to create a zoning score, the method comprising:
a) producing a zoning score having a value between 0 and 100 with the value reporting the amount to which a property:
 i. appears to be conforming to zoning code rules;
 ii. appears to possess upside potential, such as an increase in building size, less any downside risk, such as a fore-plex property in an area zoned for a single family home only;
b) obtaining data for a property to be considered;
c) obtaining each development standard from each zoning code requirement affecting the property to be considered;
d) transforming each zoning code requirement to a user defined weight ranging from 0 to 100%;
e) creating a zoning score by multiplying each zoning code requirement by the user defined weight and a true (1) or false (0) outcome, with the outcome derived by comparing a zoning code requirement to the applicable characteristic of the property to be considered, with such characteristics comprising, minimum lot size, floor area ratio, density of lot, setback—front, setback—rear, setback—side, parking units, minimum lot width, maximum height of building in feet, maximum height of building in stories, and minimum lot size.

Item 2. A method of transforming real estate records to create a report of permitted land uses, the method comprising:
a. entering a search for a specific parcel of real property;
b. retrieving a zoning code abbreviation applicable to the specific parcel of real property;
c. transforming the zoning code abbreviation into a word phrase;
d. displaying the zoning code and word phrase;
e. retrieving data pertaining to the specific parcel of real property, the retrieved data to include, lot size, location, type of building, square footage of any building, pending projects, and proximity to a hazard, with the term hazard defined as a floodplain or moratorium use; and
f. comparing the retrieved zoning code to the retrieved data pertaining to the specific parcel of real property and creating a report displaying permitted uses for the specific parcel of real property.

Item 3. A method of transforming data to create a zoning flexibility rating, the method comprising the assignment and summation of positive or negative values to the following data elements:
a) prominence of zoning codes for a location being rated;
b) number of uses permitted within the location being rated;
c) size related rules with an emphasis on density and FAR;
d) exclusion and exemptions based, in part, upon the number other sections within a code referenced;
e) parking requirements;
f) design review requirements;
g) rebuilding options in the event of property destruction;
f) bonus densities;
g) energy related controls; and
h) moratorium uses and encouraged uses.

What is claimed is:

1. A computer implemented method to calculate a zoning score, the method comprising:
a) automatically obtaining data for real property and automatically entering the data into a zoning score database;
b) automatically obtaining development standards from land use development standards and automatically entering the development standards into the zoning score database;
c) automatically entering zoning code requirements into the zoning score database;
d) automatically entering into the zoning score database one or more user entered weights mapped to one or more zoning code requirements;
e) automatically generating a zoning score by multiplying one or more zoning code requirements by the user entered weights and a true (1) or false (0) outcome, with the outcome derived by comparing a zoning code requirement to the applicable characteristics of a considered property, the characteristics comprising, minimum lot size, floor area ratio, density of lot, setback—front, setback—rear, setback—side, parking units, minimum lot width, maximum height of building in feet, maximum height of building in stories, and minimum lot size, and;
f) displaying a visual representation of the zoning score upon an electronic map.

2. The method of claim 1 wherein the user entered weights are in the range of 0 to 100.

3. The method of claim 1 comprising the steps of:
d) automatically entering structured spatial and zoning data for real property into a zoning score database;
e) automatically entering a numeric association to each parcel of real property, using the structured spatial and zoning data to generate the numeric association;
f) automatically generating a zoning score using at least one factor selected from the group comprising: 1) compliance and risk and 2) upside potential which is calculated using existing attributes for parcel from the group comprising building size and building height relative to what the zoning allows.

4. The method of claim 1 comprising computer implemented search by a specified "use" as found in a local zoning ordinance, or changed to a recognizable name to the layperson, using GIS data, property data and structured zoning data to identify locations matching property criteria, the method comprising the steps of:
c) automatically generating a response to a location suitability query, the query accepting user input of desired property use, the response filtered by one or more variables from the group comprising: lot size, existing building size, existing use, year, year built and location; and
d) expressing physical attributes of a parcel of real property as a single point of value or a range of values.

5. The method of claim 4 further comprising:
d) using an electronic map to identify properties returned in a location suitability query;
e) using additional variables for a in a location suitability query, the variables selected from the group comprising: maximum building size with number of units, maximum height and distance-to specified places; and
f) using real property from more than one zoning jurisdiction in a search query.

6. The method of claim 1 comprising a search of a property identified by jurisdiction, property identification number, address or by electronic map to return information about the property's compliance relative to its zoning using GIS data, property data and structured zoning data in a method comprising:
d) automatically calculating, measuring and reporting compliance of a specific parcel relative to the zoning;
e) automatically generating a letter of verification; and
f) including adjacent properties in search results.

7. The method of claim 1 further comprising a computer implemented search of a property identified by property identification number, address or by electronic map to return information about the property's upside potential per the zoning using GIS data, property data and structured zoning data in a method comprising:
c) automatically calculating, measuring and reporting the delta between the existing building size and potential maximum building size with number of units; and
d) automatically calculating, measuring and reporting the delta between the existing building height and potential maximum building height.

8. The method of claim 1 further comprising a computer implemented search of a group of properties identified by property identification number, addresses or by electronic map to return information about the properties upside potential per the zoning using GIS data, property data and structured zoning data.

9. A computer implemented method to combine and structure data automatically comprising the steps of:
a) importing geographic information system spatial data into database comprising of lots and parcels and base and overlay zoning obtained from a public agency or third party source in order to associate the zoning on a parcel basis;
b) automatically obtaining data for real property and automatically entering the data into a database;
c) transferring development standards related to individual zoning district basis into a database comprising of lot size and dimensions, floor area ratio, density of units, height requirements, yards or setbacks, parking;
d) transferring permissions about uses related to individual zoning districts into a database comprising of the list of identified business uses, building types, activities and associating each with a permission as identified by the specific zoning district within the jurisdiction such as "permitted" "conditional" and "prohibited";
e) entering a search for a specific parcel of real property;
f) retrieving data pertaining to a specific parcel of real property, the retrieved data to include development standards regarding the physical attributes of how the property might be developed using the parcel's zoning;
g) retrieving data pertaining to a specific parcel of real property, the retrieved data to include use permissions comprising of a name of a use and the restriction or permission regarding how the property might be used as it relates to a business, a building type and/or activity; and
h) comparing the retrieved zoning district requirements pertaining to the specific parcel of real property and creating an output displaying data returns.

10. The method of claim 9 including the steps of:
b) pairing the search results with additional data to display a further response to a location suitability inquiry, the further response including one or more land use development elements selected from the group comprising: flood zone, city limit boundaries, watersheds, enterprise zones, environmental sensitive areas, road and utility access, soils conditions, underground storage tanks, affordable housing incentives and sustainability programs comprising LEED green building programs.

* * * * *